(No Model.)
H. LEMM.
WHIFFLETREE HOOK.
No. 497,328. Patented May 16, 1893.
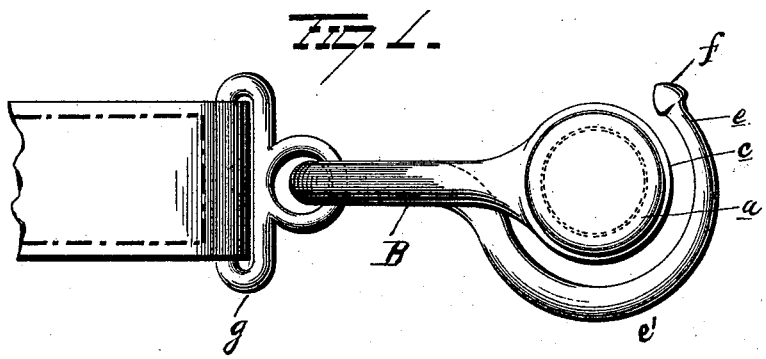
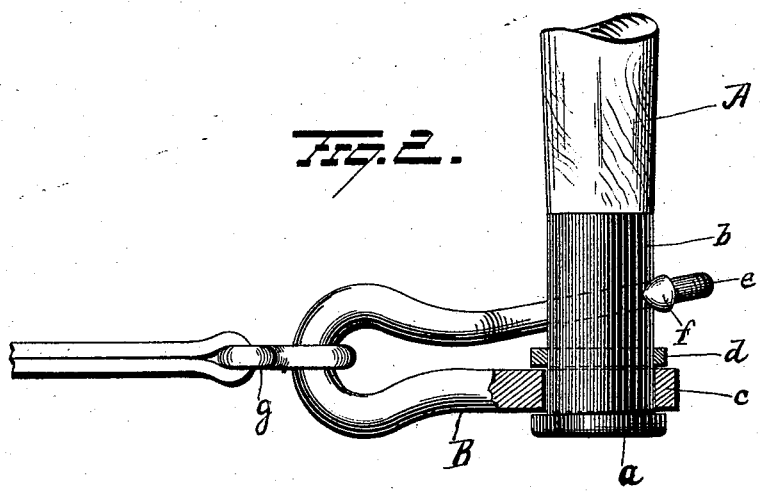
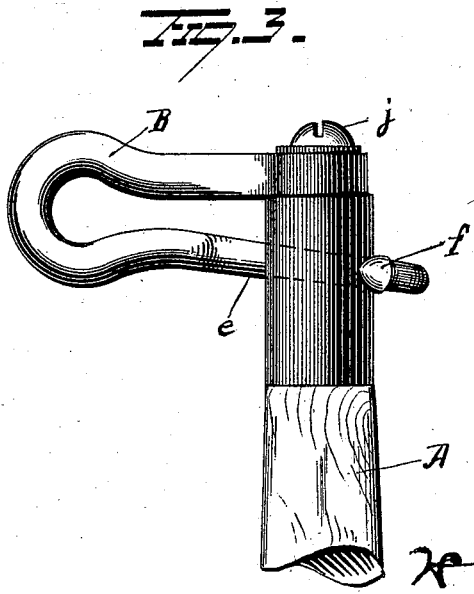
Witnesses
E. A. Nottingham
G. F. Downing
Inventor
H. Lemm.
By H. A. Symon.
Attorney

UNITED STATES PATENT OFFICE.

HIRAM LEMM, OF STORM LAKE, IOWA.

WHIFFLETREE-HOOK.

SPECIFICATION forming part of Letters Patent No. 497,328, dated May 16, 1893.

Application filed October 14, 1892. Serial No. 448,887. (No model.)

*To all whom it may concern:*

Be it known that I, HIRAM LEMM, a resident of Storm Lake, in the county of Buena Vista and State of Iowa, have invented certain new and useful Improvements in Whiffletree-Hooks; and I do hereby declare the following to be a full, clear, and exact description of the invention, such as will enable others skilled in the art to which it appertains to make and use the same.

My invention relates to an improvement in whiffletree hooks,—the object of the invention being to produce a whiffletree hook constructed and attached to the whiffletree in such manner that when the draft slackens or the tug drops down the hook will move in unison therewith without danger of becoming detached from the tug.

A further object is to produce a whiffletree hook which shall be simple in construction and effectual in the performance of its functions.

With these objects in view the invention consists in certain novel features of construction and combinations and arrangements of parts as hereinafter set forth and pointed out in the claim.

In the accompanying drawings: Figure 1, is a side view of my improved hook showing the manner of attaching the tug thereto. Fig. 2 is a sectional view of a portion of a whiffletree having my improvement applied thereto. Fig. 3 is a view of a modification.

A represents the whiffletree having a head or collar $a$ formed at the ends thereof. A sleeve $b$ is placed on the whiffletree adjacent to the collar or enlargement $a$.

My improved hook B is made at one end with a loop or opening $c$ for the reception of the sleeve or ferrule $b$, one face of said loop being adapted to lie adjacent to the collar or enlargement $a$. After the hook B is thus placed on the sleeve or thimble $b$ on the end of the whiffletree, a collar $d$ is placed on said sleeve adjacent to the loop $c$ at the opposite side thereof from the collar or enlargement $a$ said collar $d$ being secured to the sleeve or ferrule $b$ in any suitable manner. By thus attaching the hook to the whiffletree it will be permitted to have a free oscillatory motion and will be prevented from lateral movement by the collars $a$, $d$. The free end $e$ of the hook is made to extend under the whiffletree and to partially embrace the same without contact therewith and at its extremity is preferably provided with a head or enlargement $f$. The buckle $g$ to which the hame tug is connected, is attached to the hook B as shown in Fig. 1. From this construction and arrangement of parts it will be seen that when the draft is relaxed or diminished the tug will fall somewhat, and that the hook B will be free to turn on the whiffletree in unison with the movement of the tug, and that owing to the construction of the hook the detachment of the parts will be effectually prevented. Thus the hook B will be free to yield to the movements of the tug. The portion $e'$ of hook B is made heaviest so that it will fall freely.

Instead of connecting the hook to the whiffletree as above explained, the construction shown in Fig. 3 may be adopted,—in which case the butt end of the hook will be provided with a perforation through which a pin or screw $j$ passes, the latter being secured to the end of the whiffletree. It is of course understood that each end of the whiffletree will be provided with my improvements and that the device is also applicable to neck yokes and other like devices.

The device is simple in construction, cheap to manufacture and effectual in the performance of its functions.

Having fully described my invention, what I claim as new, and desire to secure by Letters Patent, is—

As an article of manufacture, a whiffletree hook consisting essentially of a body portion adapted to be attached to the whiffletree, a portion of the body portion bent backward in the direction of the attached end to form a hook or loop and the free end bent part way around the whiffletree concentric with the latter, substantially as set forth.

In testimony whereof I have signed this specification in the presence of two subscribing witnesses.

HIRAM LEMM.

Witnesses:
 J. K. LEMON,
 JOHN R. LEMON.